Nov. 12, 1940.  R. H. BOOK ET AL  2,221,536
MOTOR CARRIER FOR POWER SHELLERS
Filed June 3, 1938  2 Sheets-Sheet 1
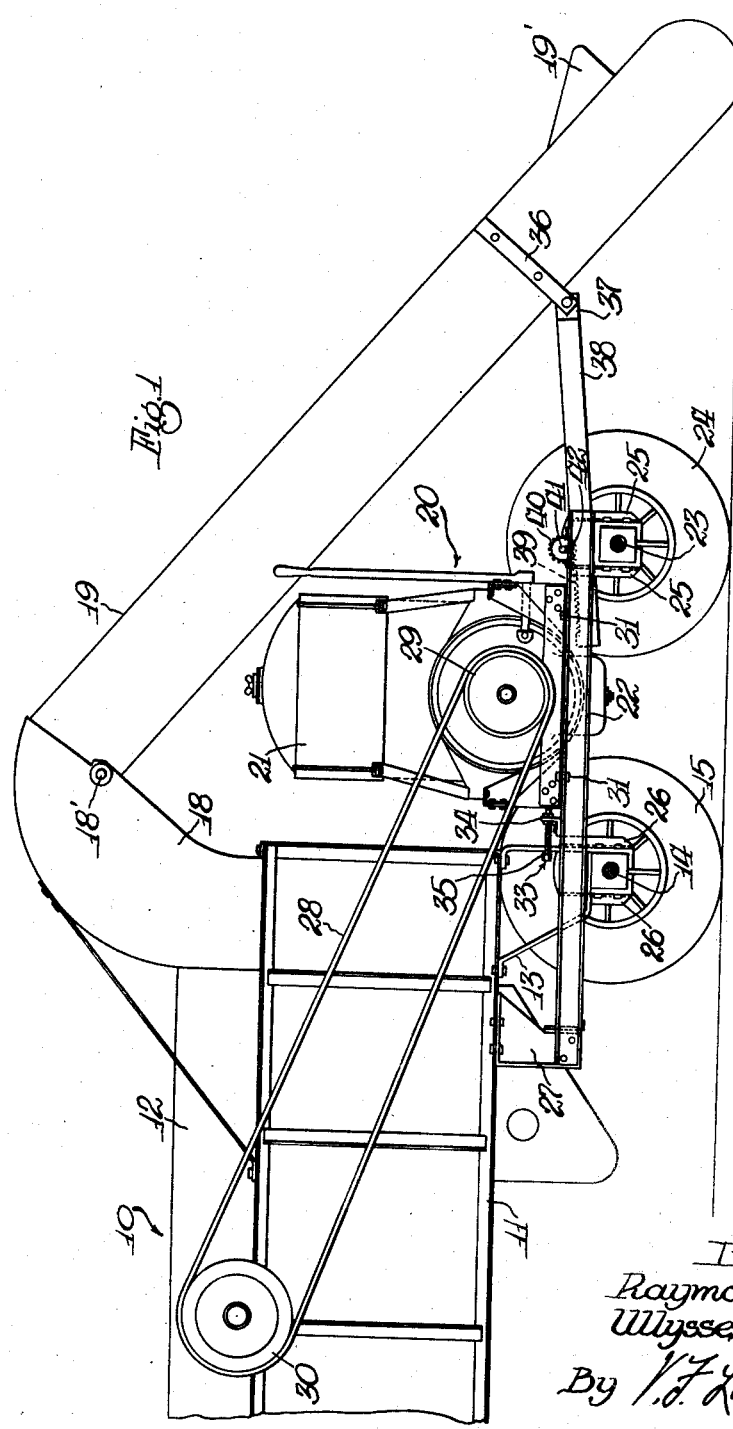
Inventors
Raymond H. Book
Ulysses Grant Currier
By V. F. Lassagne
Att'y.

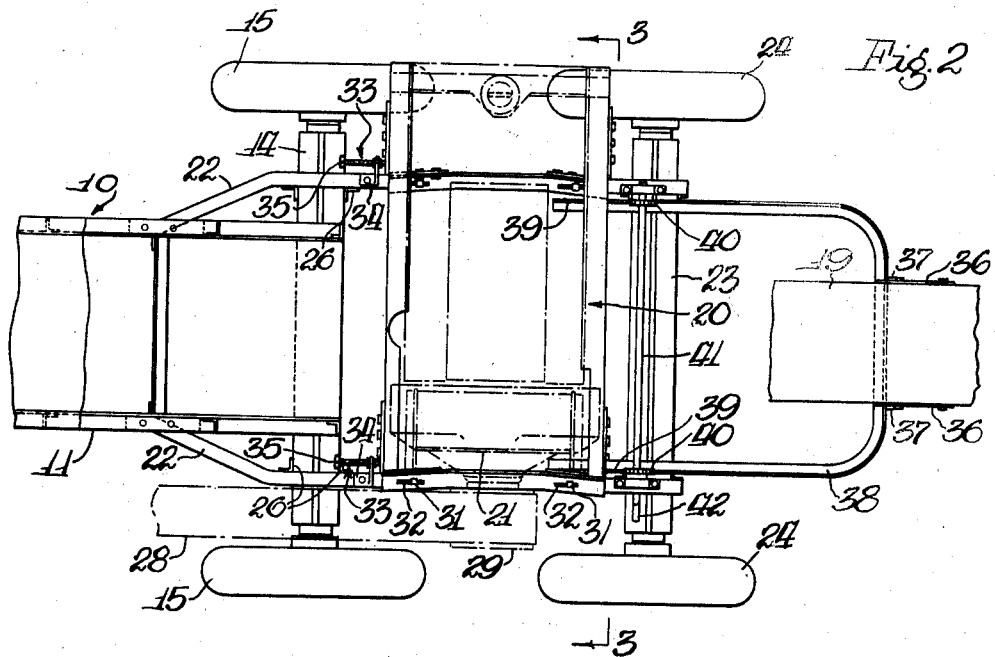
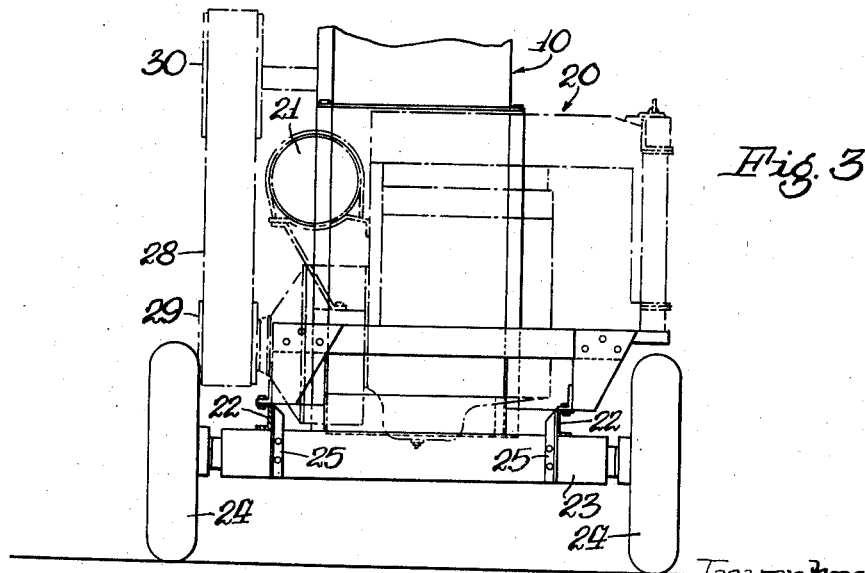

Patented Nov. 12, 1940

2,221,536

UNITED STATES PATENT OFFICE 2,221,536

MOTOR CARRIER FOR POWER SHELLERS

Raymond H. Book and Ulysses Grant Currier, Rock Falls, Ill., assignors to International Harvester Company, a corporation of New Jersey Application June 3, 1938, Serial No. 211,625

1 Claim. (Cl. 130—6)

This invention relates to a power unit attachment for a corn sheller.

A machine such as a corn sheller normally does not carry a power unit as part of the sheller. Consequently, power must be supplied from some device separate from the sheller. It is desirable to attach the sheller and power unit so that they may be easily transported together.

An object of the invention is to provide an improved power unit attachment for a corn sheller.

Another object is the provision of a power unit which is capable of simple attachment to the frame of a corn sheller and which, with the sheller, can be easily transported.

Other objects will appear from the disclosure.

According to the present invention, the improved power unit attachment includes a wheel-supported axle and beams connected at one end to the axle. The other end of the beams extends across an axle of a corn sheller and are connected to the body of the sheller inwardly of the axle. The beams are also secured to the axle. Thus, the corn sheller and power unit are firmly secured together in such a manner that they may be easily transported.

In the drawings:

Figure 1 is a side elevation, showing a corn sheller with the improved power unit attachment secured thereto;

Figure 2 is a plan view of the structure of Figure 1, with parts thereof omitted and other parts in dotted lines; and, Figure 3 is a sectional view taken along the line 3—3 of Figure 2, with parts in dotted lines.

A corn sheller 10, having a body or frame 11 and sheller cylinder 12, is supported at one end on bracket members 13 resting on an axle 14 supported by wheels 15. The other end of the sheller, not shown, is supported in similar fashion. A hopper 18 is positioned at one end of the sheller and at 18' pivotally supports one end of a feed elevator 19 having a funnel 19' for receiving ears of corn. For a more complete showing of a sheller of this type, attention is directed to the patent to Mitchell No. 1,461,283, of July 10, 1923. No further description of the sheller is thought necessary, since it forms no part of the present invention.

Attention is now directed to a novel power unit attachment 20. This attachment comprises a power unit 21, such as a gasoline engine, a pair of I-beams 22, and axle 23 supporting one end of the beams, and a pair of wheels 24 supporting the axle 23. Bracket members 25 attach the I-beams 22 to the axle 23. The I-beams extend across and are attached to the axle 14 of the sheller 10 by similar brackets 26. The ends of the beams are attached to the under side of the body or frame 11 a considerable distance inwardly of the axle 14 by means of bracket members 27. As seen in Figure 2, the beams are parallel over their portions between the axle 23 of the power unit attachment and the axle 14 of the sheller, being secured to the latter axle at points outwardly of the brackets 13, which support the body or frame 17 of the sheller. Beyond the axle 14, the I-beams 22 converge toward one another to their points of attachment to the frame 11, by means of the brackets 27.

The power unit 21 is adjustable along the length of the beams 22 for the sake of the tightening of a belt 28 forming a driving connection between a driving pulley 29 of the power unit and a driven pulley of the sheller. Bolt and nut connections 31 hold the power unit down on the beams, but the slots 32 in the power unit, which receive the bolts, permit a movement of the unit along the beams. This movement is effected by means of a pair of adjusting devices 33, each comprising a bracket member 34 secured to an I-beam 22 and a bolt 35 received in a threaded hole in the bracket member 34. The ends of the bolts contact the power unit 21. When the bolts are turned, they move lengthwise and effect a movement of the power unit along the beams.

As previously stated, one end of the feed elevator 19 is pivotally supported by the hopper 18. The other end of the elevator is supported by means of straps 36 secured to opposite sides of the elevator 19. The straps are secured to a bracket 37 attached to a U-shaped member 38 formed of angle iron and having rack portions 39 at the ends of the legs. The rack portions are in mesh with pinions 40 mounted on a shaft 41, having a crank-engaging portion 42 at one end. Raising and lowering of the end of the elevator 19 is effected by a turning of the shaft 41 by means of a crank engaging the portion 42 of the shaft. Figure 1 shows the end of the elevator on the ground in position to receive ears of corn through the funnel 19'. For transport, the elevator 19 is raised.

It will be apparent from the above description that an improved mode of attachment of a corn sheller and a power unit therefor has been provided. Because of the way in which the two units are attached, transportation is facilitated. It will be apparent that this same idea may be applied in other ways; for example, in attaching a power unit to any sort of device to which power must be supplied.

It is to be understood that the invention is capable of modifications and that the scope thereof is to be limited only to the terms of the appended claim.

What is claimed is:

In combination, a sheller including a frame, an elevator pivotally connected to one end of the frame, a wheel supported axle carrying the frame at the end to which the elevator is connected, and a power unit attachment including a wheel supported axle, a pair of beams connected at one end to the last mentioned axle and extending across the axle of the sheller and attached at the other end to the frame a considerable distance inwardly from the axle, a U-shaped member connected to the elevator at the base of the U and having rack portions at the ends of the legs of the U, a shaft rotatably mounted over the axle of the power unit attachment, and a pair of pinions fixed to the shaft in mesh with the rack portions on the U-shaped member.

RAYMOND H. BOOK.
ULYSSES GRANT CURRIER.